United States Patent [19]

Fleischhacker et al.

[11] 4,261,087

[45] Apr. 14, 1981

[54] APPARATUS FOR CONNECTING PAIRS OF WIRES

[75] Inventors: James E. Fleischhacker, Winston-Salem, N.C.; Lincoln E. Roberts, Dunedin, Fla.; Albert D. Willette, Pfafftown, N.C.

[73] Assignee: AMP Incorporated, Harrisburg, Pa.

[21] Appl. No.: 24,344

[22] Filed: Mar. 27, 1979

Related U.S. Application Data

[62] Division of Ser. No. 887,699, Mar. 17, 1979, Pat. No. 4,148,118.

[51] Int. Cl.[3] .............................................. B23Q 7/00

[52] U.S. Cl. ................................. 29/33 M; 29/566.2; 29/759; 227/136

[58] Field of Search ................ 29/753, 754, 759, 56.5, 29/33 M, 33 K, 822, 564.6, 566.2; 221/71, 72, 73, 74; 442/55.2, 67.3 R; 227/136, 16, 80

[56] References Cited

U.S. PATENT DOCUMENTS

| | | | |
|---|---|---|---|
| 2,845,108 | 7/1958 | Hammell et al. | 29/564.6 |
| 2,979,726 | 4/1961 | Carlzen et al. | 221/74 |
| 3,186,589 | 6/1965 | West et al. | 221/73 X |
| 3,314,580 | 4/1967 | Parker | 227/136 |
| 3,423,815 | 1/1969 | Spangler | 29/753 X |
| 3,527,382 | 9/1970 | Knoll | 242/67.3 R X |
| 3,659,328 | 5/1972 | Klein | 29/566.2 X |
| 3,668,760 | 6/1972 | Biederman | 29/739 X |
| 3,710,611 | 1/1973 | Filia | 29/751 X |
| 3,724,054 | 4/1973 | Fernald | 29/566.2 X |
| 3,813,753 | 6/1974 | Miller | 29/566.2 |
| 3,967,356 | 7/1976 | Holt | 29/753 X |
| 3,975,812 | 8/1976 | Fleischhacker et al. | 29/753 |
| 4,040,180 | 8/1977 | Brown | 29/759 X |
| 4,043,032 | 8/1977 | Spangler | 29/753 X |
| 4,173,067 | 11/1979 | Steiner | 29/759 X |

*Primary Examiner*—William R. Briggs
*Attorney, Agent, or Firm*—Gerald K. Kita

[57] ABSTRACT

The present invention relates to apparatus for storing and serially positioning a series of carrier strip mounted electrical connectors at a wire insertion station whereat pairs of small gauge insulated wires are trimmed and inserted into the electrical connectors. Each wire-receiving portion of a connector is located by a projecting portion on the connector. A reeling device advances the carrier strip until the projecting portion registers against a stop which momentarily positions the wire-receiving portion correctly at the insertion station. Subsequent to connection of a pair of wires in the connector the stop is removed allowing advancement of the carrier strip. The stop is then replaced to engage another of the projections on the same connector or another connector to position momentarily another wire-receiving portion of the connector at the insertion station. By applying continuous tension on the carrier strip each wire-receiving portion is advanced and momentarily positioned at the wire-receiving station despite any variation in the length of feed required of the carrier strip.

5 Claims, 13 Drawing Figures

Fig. 3B
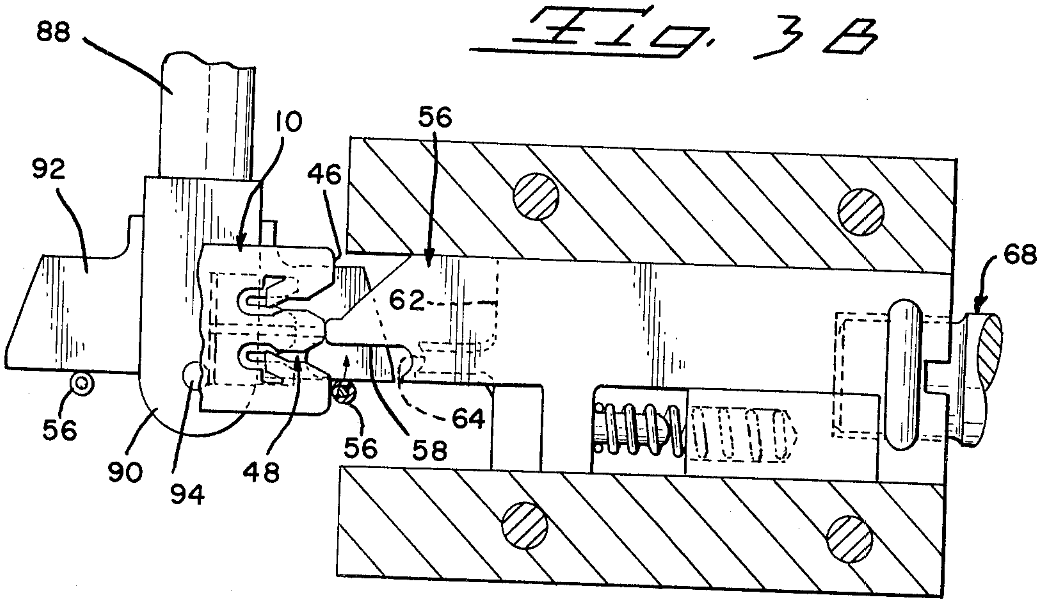
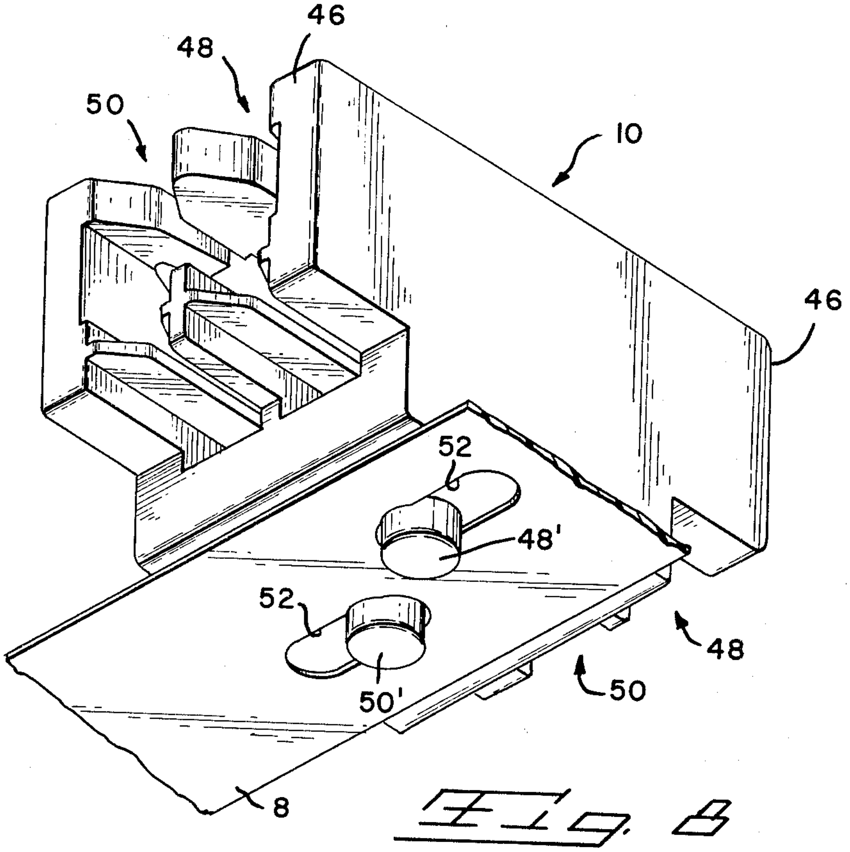
Fig. 8

APPARATUS FOR CONNECTING PAIRS OF WIRES

This is a division, of application Ser. No. 887,699, filed Mar. 17, 1979 and now U.S. Pat. No. 4,148,118.

BACKGROUND OF THE ART

U.S. Pat. No. 3,975,812 discloses apparatus for storing and feeding a series of electrical connector segments mounted on a flexible carrier strip. The apparatus positions wire-receiving portions of each connector segment in turn at a wire insertion station. An operator introduces pairs of wires to the insertion station. The presence of the wires actuates a wire trimming and insertion mechanism which severs the wires to desired lengths and inserts them into the corresponding wire-receiving portions of a connector. The carrier strip is repeatedly advanced to position successive wire connecting portions at the insertion station. Air logic is utilized to vary the length of feed of the carrier strip to accommodate different spacings of successive wire-receiving portions in the same connector, or in separate connector segments.

SUMMARY

The present invention is an improvement of the apparatus disclosed in the above referenced patent. The present invention apparatus performs the similar functions of storing and feeding carrier strip mounted connector segments to a wire insertion station. However, variations in the length of feed for the carrier strip are provided without the need for air logic and without a need for preprogramming the length of feed. More particularly, in the apparatus according to the present invention the length of feed is self-adjusting to varied spacing of successive wire-receiving portions. An additional improvement resides in the provision of an electrical probe which is advanced with the wire insertion mechanism for testing the electrical connection immediately upon insertion of the wire in a connector segment. According to another improvement, the wire insertion mechanism is activated only when both wires are suitably positioned or presented for insertion in a connector. It has been found from tests that merely presenting both wires to cause actuation of the insertion mechanism is not sufficient. When the insertion mechanism actuates, one or both of the wires on occasion may be released or may vibrate out of position causing their failure to be correctly inserted into a connector segment. The present invention provides a push rod which must be displaced by an operator urging both wires against a portion of the push rod to displace the same a length of stroke sufficient to allow movement of both wires into proper position for activating the wire insertion mechanism. A back pressure is provided on the piston which must be overcome by the urging of both wires. This back pressure may be adjusted to require a desired degree of firmness of pressure of the wires against the piston assembly. The wires when firmly against the push rod assembly are prevented from vibrating out of position or are prevented from inadvertant release by an operator during actuation of the wire insertion mechanism.

Accordingly, an object of the present invention is to provide an improved apparatus for inserting pairs of wires into electrical connector segments provided serially on a flexible carrier strip.

Another object of the present invention is to provide apparatus for storing and feeding a plurality of electrical connector segments to a work station whereat pairs of electrical wires are inserted into wires receiving portions of the connector segments, with means for repeatedly advancing the carrier strip without a need for logic to determine the length of feed.

Another object of the present invention is to provide apparatus for inserting pairs of wires into wire-receiving portions of electrical connector segments mounted serially along a flexible strip together with means for incrementally advancing said strip, automatically adjusting the length of feed as determined by the variation in spacing between successive wire-receiving portions which are either on the same connector segment or on different connector segments tandemly carried on the strip.

Another object of the present invention is to provide apparatus for inserting pairs of wires into electrical connector segments mounted serially along an incrementally advanced carrier strip, together with adjustable means for triggering actuation of a wire insertion mechanism only when both of a pair of wires are suitably positioned and firmly retained in position throughout the time of actuation of the wire insertion mechanism.

Other objects and attendant advantages of the present invention will become apparent from the following detailed description taken in conjunction with the drawings.

FIG. 3B is an enlarged fragmentary section taken along the line 3B—3B of FIG. 3 illustrating the wire insertion mechanism in plan view.

FIG. 8 is an enlarged fragmentary perspective of a connector segment mounted to the flexible carrier strip by projecting portions which are used for locating the connector segment in the apparatus by the mechanism shown in FIGS. 6, 7A and 7B.

DETAILED DESCRIPTION

Figure 1:
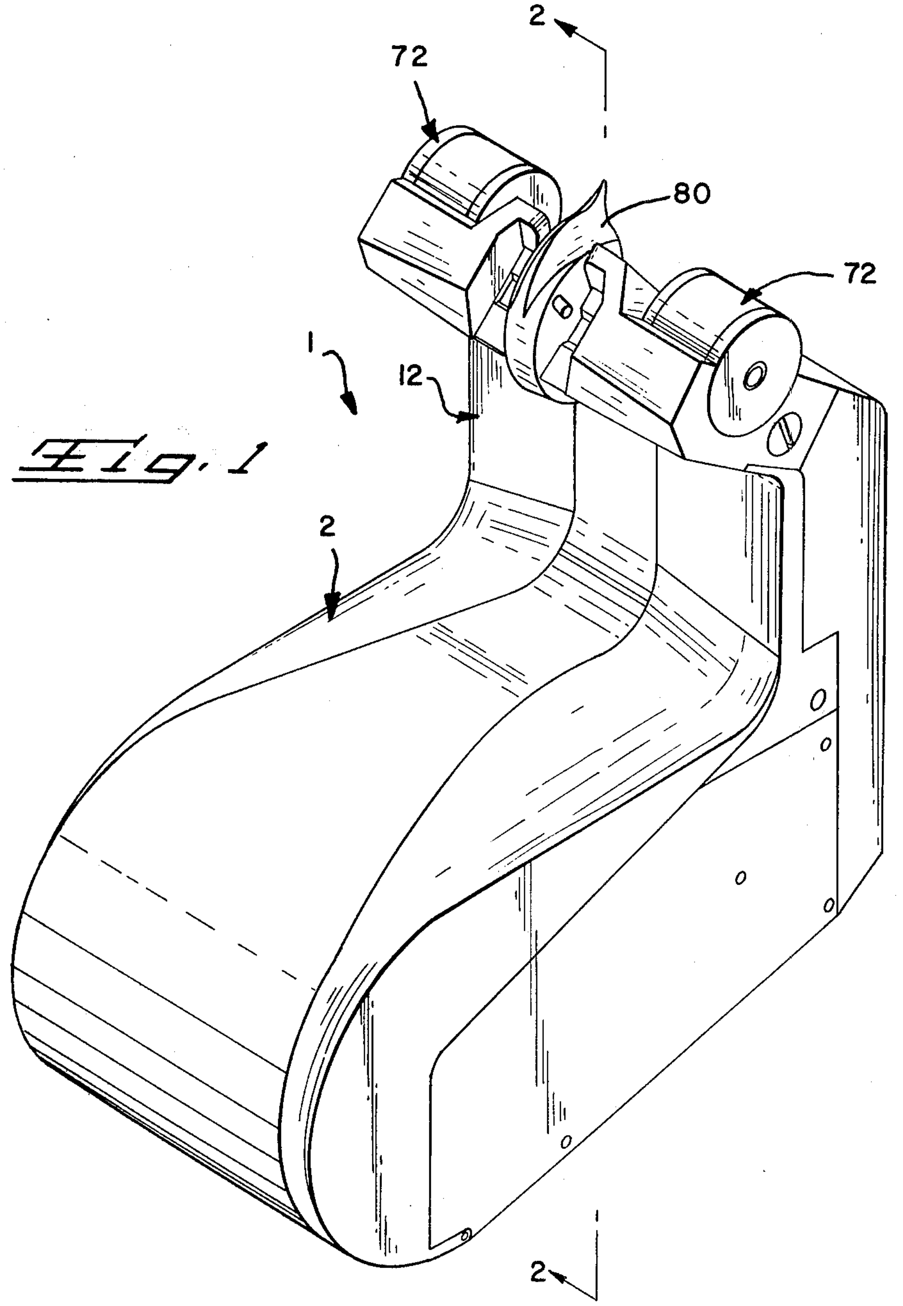
FIG. 1 is a perspective of the improved apparatus according to the present invention.
Figure 2:
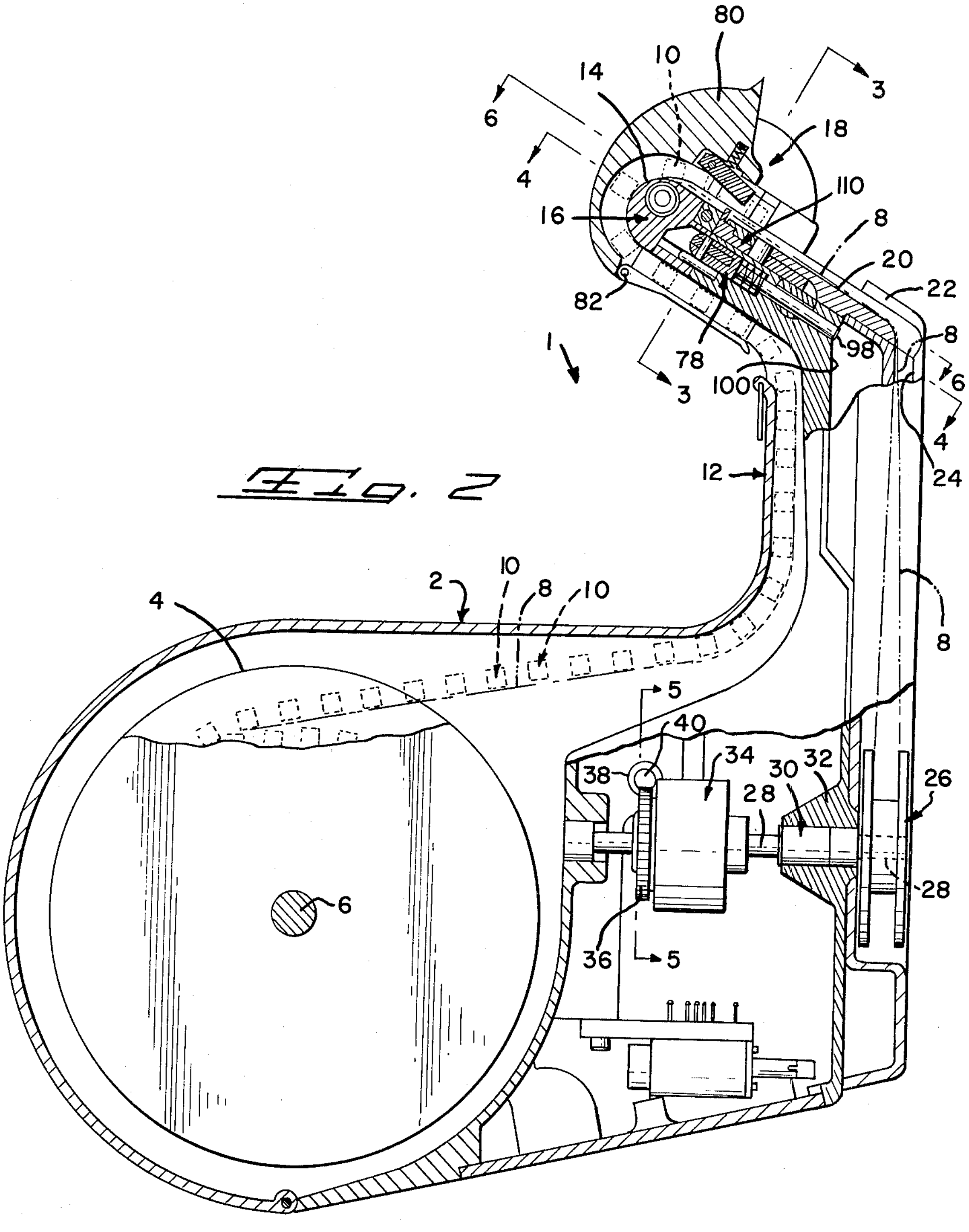
FIG. 2 is an enlarged elevation in section taken along the line 2—2 of FIG. 1.
Figure 2A:
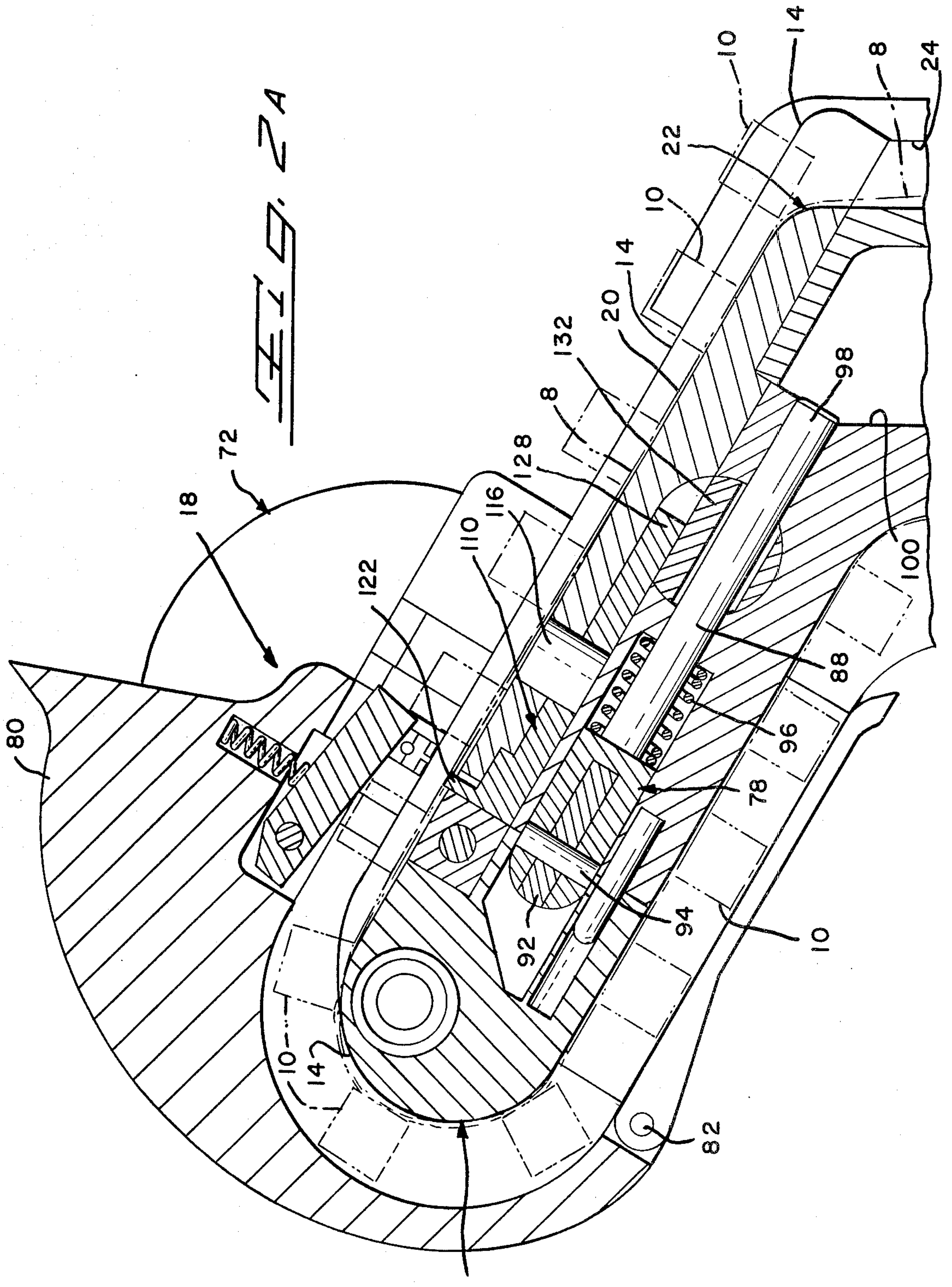
FIG. 2A is an enlarged view of the upper portion of FIG. 2.
Figure 5:
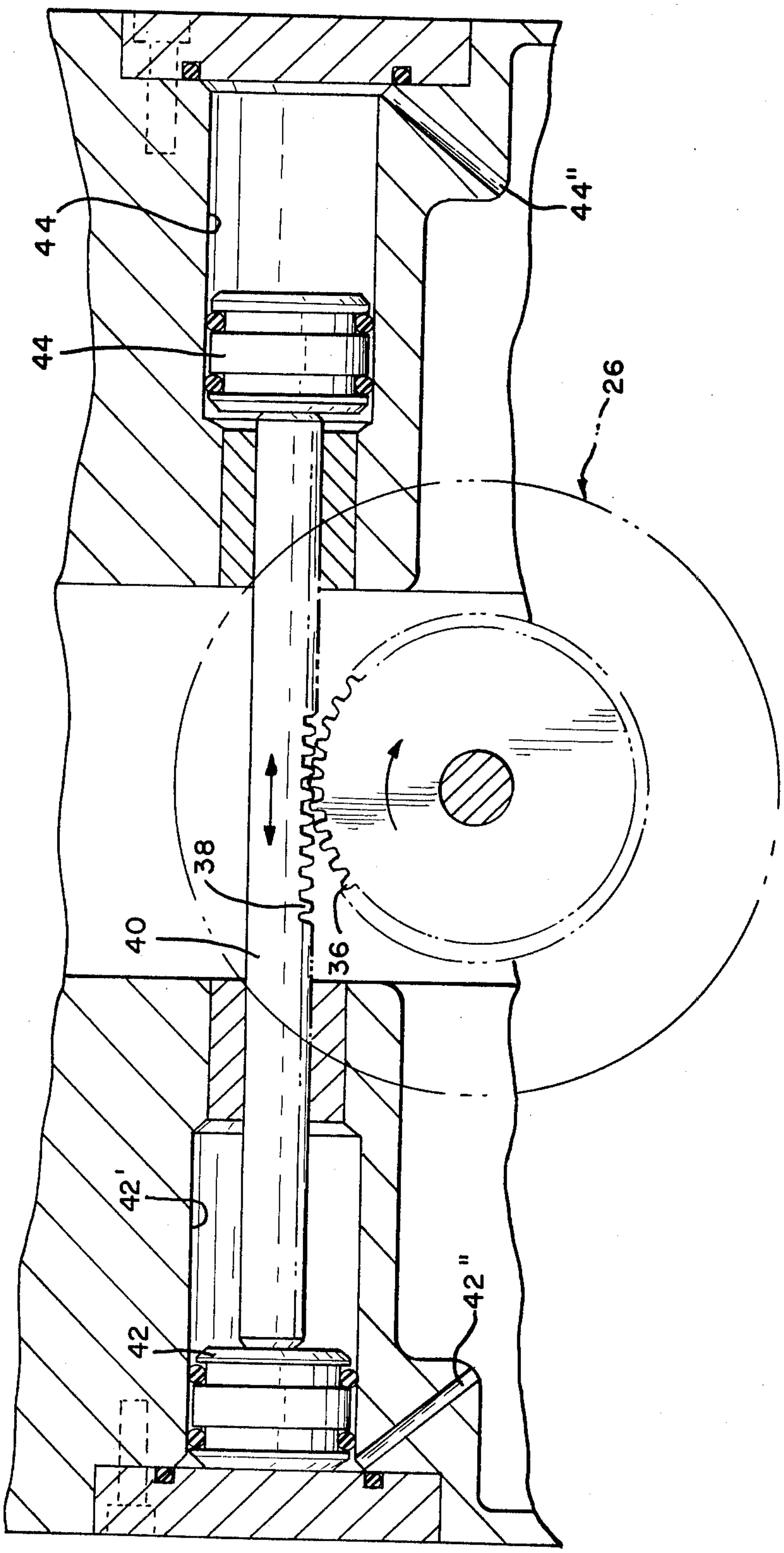
FIG. 5 is an enlarged fragmentary section of a portion of the apparatus taken along the line 5—5 of FIG. 2 illustrating a take-up or reeling mechanism for a carrier strip on which electrical connector segments are mounted.

With more particular reference to FIGS. 1 and 2 of the drawings, an improved apparatus according to the invention for connecting pairs of wires in electrical connector segments is generally indicated at 1. The apparatus includes an outer hollow housing 2 or case in which is mounted a cylindrical reel 4 rotatable about a shaft 6 mounted horizontally. A flexible carrier strip 8 having tandemly mounted electrical connector segments 10 is reeled and stored upon the reel 4. The carrier strip 8 threads its way from the reel upwardly through a vertical neck portion 12 and is fed slidably over an obversely curved track surface 14 of a guideblock or anvil 16 mounted in an upper portion of the housing 2. Each connector segment 10 will be slidably traversed over the annular end of guide block 16 and momentarily located in a manner to be described at a wire trimming and insertion station generally indicated at 18 whereat a pair of insulated small guage wires are presented by an operator to the insertion station for insertion into corresponding wire-receiving portions of the momentarily positioned connector segments. Subsequent to insertion of a desired wire pair, the segments are serially advanced together with the carrier strip 8 slidably along an inclined escapement surface 20 of the guideblock 16. As shown in FIG. 2A, the carrier strip is pulled at an acute angle over the hump 22, while the segments 10 continue along the track 14. The connector segments thereby become separated from the carrier strip which is fed or advanced down a vertical track 24 extending along the neck 12. The carrier strip 8 is fed downwardly along the track 24 and is taken up on a reel 26 which is mounted on a horizontal shaft 28. The shaft 28 passes through a one way bearing 30 mounted in a bearing block 32 integral with the case 2. The shaft 28 is connected to one side of a one way clutch 34. The other side of the clutch 34 is connected to a rotatable circular gear or pinion 36 driven by a rack 38 on a reciprocating, pneumatically driven piston 40. The details of the rack and pinion are more particularly illustrated in FIG. 5. The piston rod 40 is connected at either end to a piston 42 and 44 which slidably reciprocate in corresponding piston chambers 42' and 44'. Air under pressure is supplied alternatively to the piston chambers through the corresponding inlet ports 42" and 44". As shown in FIG. 5, the air under pressure is being currently supplied to chamber 44" causing reciprocation of the piston rod 40 from right to left. Upon supplying air under pressure instead to chamber 42" the piston rod 40 will reciprocate from left to right causing a corresponding rotation of the pinion 36.

With reference to FIG. 2 taken in conjunction with FIG. 5 oscillation of the piston rod 40 is transferred to one way rotation of the shaft 28 through the one way clutch 34, which in turn causes rotation of the take-up reel 26 in only one direction so as to wind up the carrier strip 8 thereon. The one way bearing 30 locks the take-up reel 26 against any rotation in a reverse direction. The bearing also provides sufficient resistance to reverse rotation such that the one way clutch 34 will desirably slip in response to a reverse rotation of the pinion 36 by the reciprocating piston rod 40.

Each of the electrical connector segments is illustrated more particularly in FIG. 8. The details of each connector segment is more particularly described in U.S. Pat. No. 3,975,812, referenced above. The connector has opposite sides 46 in which are provided a first pair of opposed wire receiving portions 48 and a second pair of wire receiving portions 50. The details of the wire receiving portions 48 and 50 are disclosed in the above referenced patent. According to the present invention a first pair of wires presented at the wire insertion station 18 by an operator will cause wire insertion of the pair of wires into a corresponding pair of wire receiving portions 48. The presentation of a subsequent pair of wires to the insertion station 18 will cause insertion of the pair of wires into the second pair of wire receiving portions 50. Each connector segment 10 is secured to the flexible carrier strip 8 by projecting stud portions 48' and 50' which are force fitted within slotted apertures 52 in the carrier strip 8. The stud 48' is precisely located with respect to the pair of wire receiving portions 48, and the stud portion 50' is similarly located with respect to the wire receiving portions 50. In this manner the stud portions 48' and 50' are utilized to precisely position the corresponding wire receiving portions of the connector segment 10 correctly at the wire insertion station 18 in a manner to be described.

Figure 3:
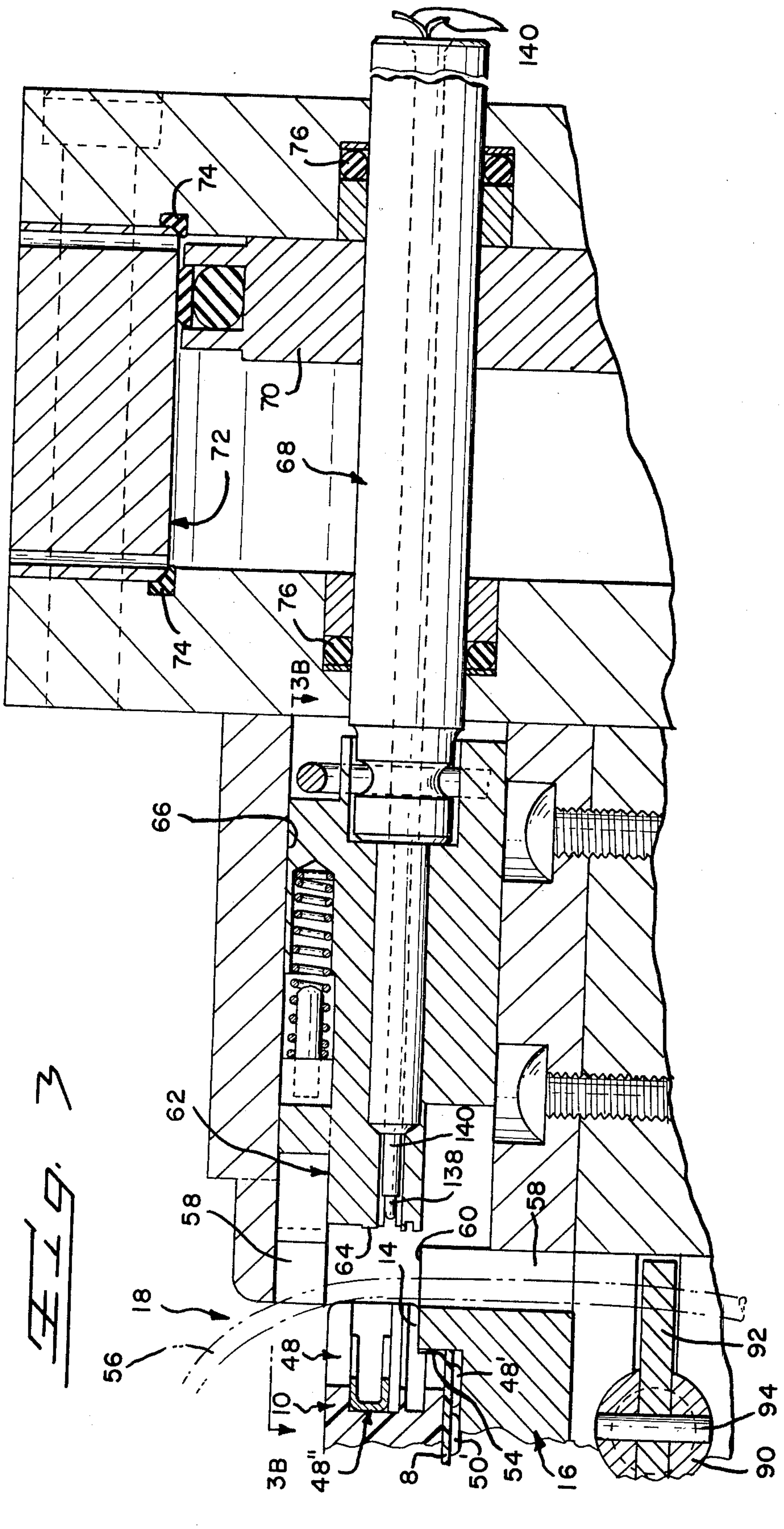
FIG. 3 is an enlarged fragmentary section taken along the line 3—3 of FIG. 2 illustrating one of a pair of wire insertion mechanisms.

FIG. 3 illustrates in section a connector segment 10 correctly positioned at the wire trimming and insertion station 18. As shown the guide block 16 is provided with a recess 54 therein, which receives the carrier strip 8 and the projecting studs 48' and 50'. Although one wire receiving portion 48 is illustrated, it is understood that both wire receiving portions 48 are positioned at the wire trimming and insertion station 18 for receipt of the corresponding pair of wires therein. Each wire receiving portion 48 is provided with a corresponding U-shaped electrical contact 48" into which a corresponding wire is to be inserted for electrical connection therewith.

Figure 3A:
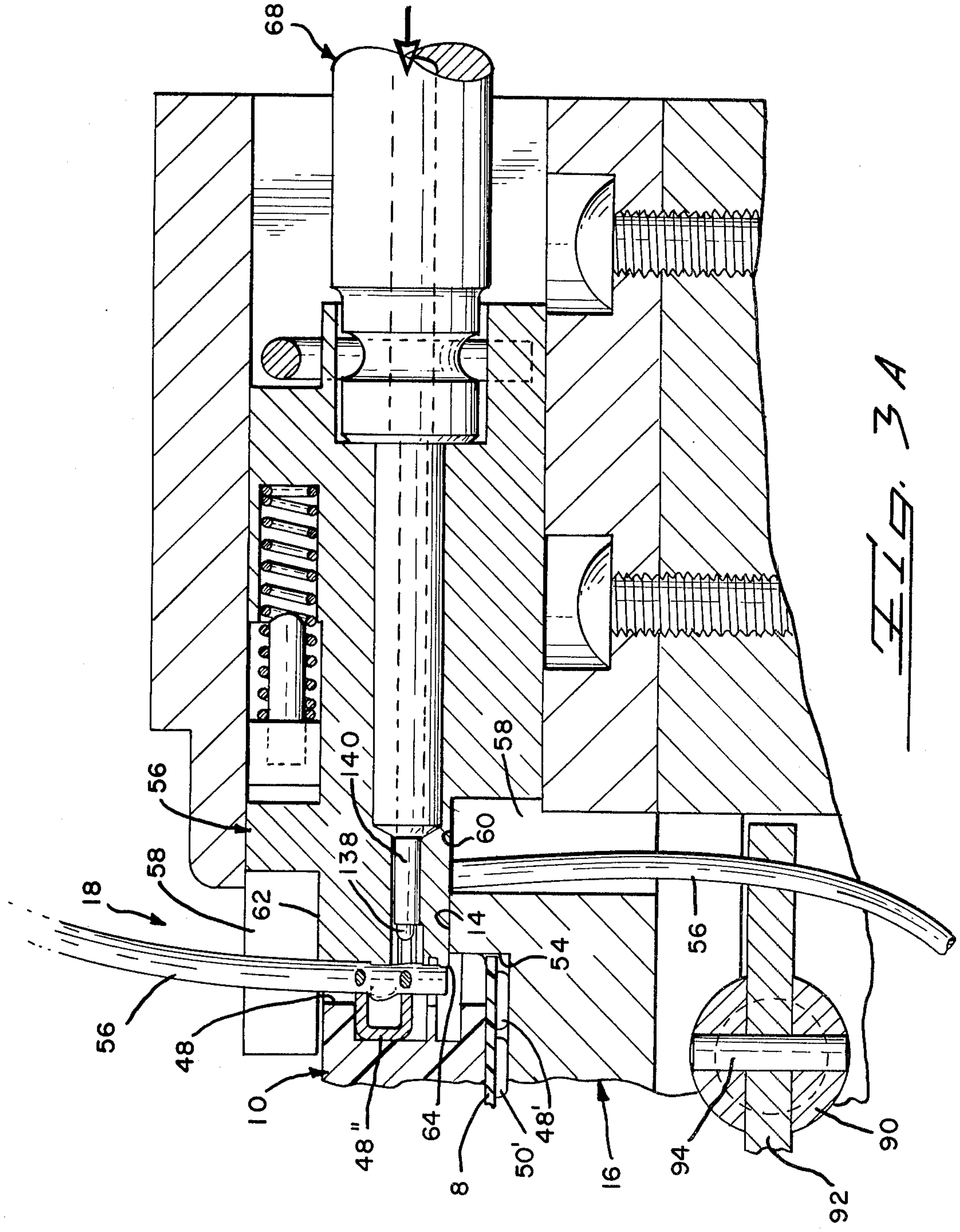
FIG. 3A is a fragmentary view similar to FIG. 3 illustrating the wire insertion mechanism of FIG. 3 at the completion of a wire insertion stroke, with an inserted wire also being trimmed to length.

As shown in FIGS. 3 and 3A, each contact portion 48" faces a wire insertion and trimming mechanism, one of which is illustrated generally at 56. A pair of wires 56 are grasped and presented by an operator to the insertion station 18 in such a manner that each wire 56 is positioned along the opposite sides 46 of the connector segment 10 and is impinged against a fixed wire anvil 58. The anvil 58 is provided with a passageway 60 therethrough which slidably receives a reciprocating ram 62. The ram 62 is provided with a wire insertion head 64 which is urged through the passageway 60 to impinge against a length of a corresponding wire 56 which bridges across the passageway 60. The insertion head 64 then is further propelled forwardly to partially enter a corresponding wire receiving portion 48 of a connector segment 10 to insert the corresponding wires 56 into the contact 48". As shown in FIG. 3A as the insertion head 64 slidably passes and overlies the surface 14 the corresponding wire 56 is severed at the intersection of the tool head 64 and the surface 14. The wire is trimmed to suitable length for receipt within the confines of the connector segment 10 and the severed portion of the wire remains in the grasp of the operator to be discarded.

As shown in FIGS. 3 and 3A, the ram 62 is slidably mounted in a cavity 66. The ram is mounted on a cylindrical piston rod 68 which is provided with an enlarged, double acting piston 70 which slidably reciprocates within a cylindrical piston chamber 72. Seals 74 seal the joints of the piston chamber. Additional seals 76 are provided over the piston rod 68 to seal off pneumatic pressure on either side of the piston 70 to provide for reciprocation of the same. More particularly, air under pressure is supplied to the right hand side of the piston 70 within the chamber 72 as shown in FIG. 3 to actuate the ram 62 to its position shown in FIG. 3A. Subsequently, air under pressure supplied to the left hand side of the piston 70 within the chamber 72 to reciprocate the ram 62 to its position shown in FIG. 3.

Figure 4A:
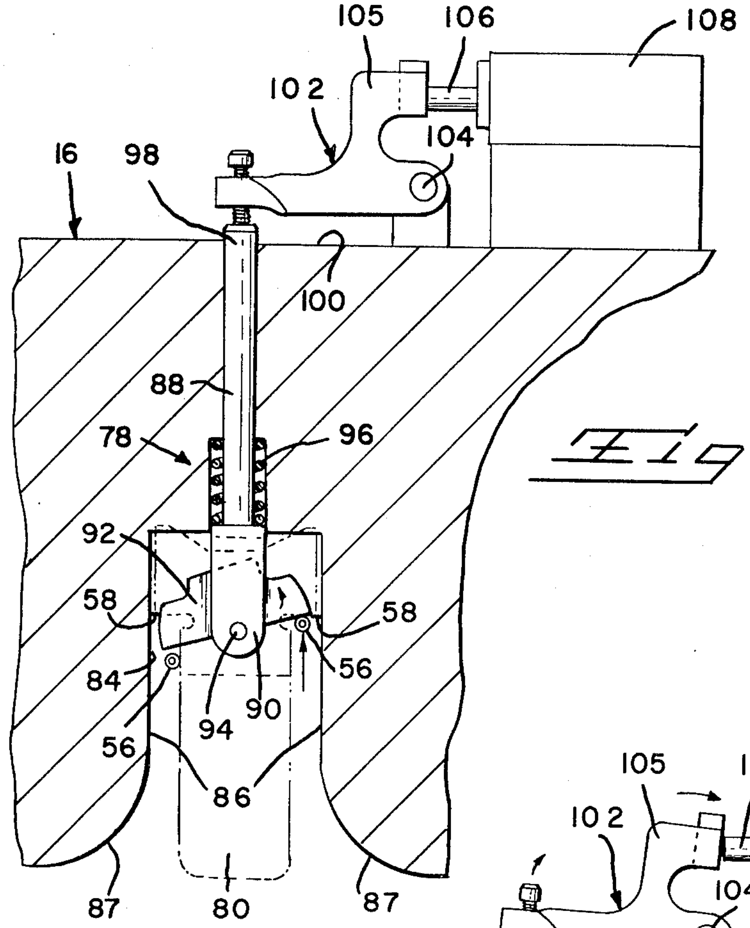
FIGS. 4A and 4B are enlarged fragmentary sections illustrating a mechanism which controls wire positioning and triggering of the wire insertion mechanism when a pair of wires are correctly positioned, with FIG. 3A further illustrating the mechanism in an inoperative mode when only one of a pair of wires is in correct position.
Figure 4B:
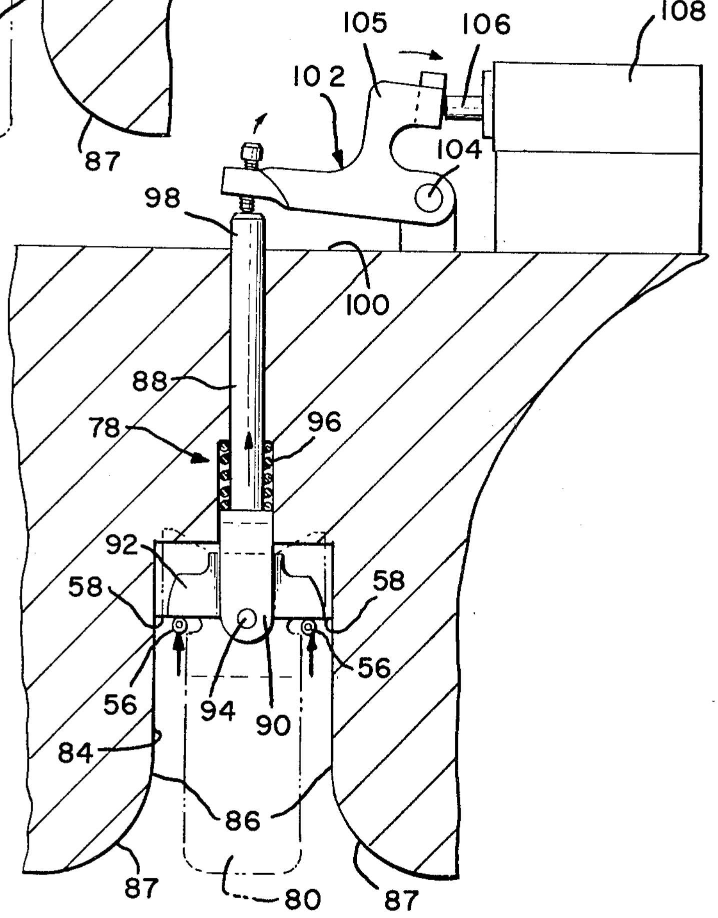

Actuation of the ram 62 occurs only when a pair of wires 56 are correctly positioned at the wire insertion station. The mechanism for insuring proper positioning of the wires is illustrated at 78 more particularly in FIGS. 4A and 4B considered in conjunction with FIGS. 3A and 3B. The mechanism comprises a central projecting cusp 80 hingably connected to the case at 82 (FIG. 2) for pivoting to overlie the arcuate guide block 16. As shown in FIGS. 4A and 4B, the guide block 16 is provided with a deeply recessed opening 84 defining wire receiving channels 86 on either side of the cusp 80. The channels 86 may have arcuately flared entryways 87. The wire positioning mechanism 78 further includes a reciprocating push rod 88, one end 90 of which protrudes into the recessed opening 84 and is provided with a flapper 92 pivotally connected at 94 to the rod end 90. A coil spring 96 encircles the rod 88 and provides a resilient bias tending to urge the rod end 90 toward the flared entryways 87 of the wire receiving channels 86. The other end 98 of the rod protrudes into a hollow cavity 100 (FIG. 2) of the neck portion 12 where it engages a double armed crank 102 pivotally connected to the guide block 16 at 104. The other arm 105 of the crank 102 engages an actuator 106 of a plunger actuated pneumatic valve 108 mounted to the frame 12 within the hollow portion 100.

An operator grasps a pair of wires 56 and traverses them into corresponding wire receiving passageways 86 on either side of the cusp 80, forcing the wires freely along the passageways 86 until they engage the flapper 92. The operator then pushes both wires against the flapper 92, causing the rod 88 to be displaced against the resilient biasing action of the coil spring 96, further causing the crank arm 102 to pivot and depress the plunger 106 of the valve 108. The valve is utilized to supply air to and thereby to trigger the wire insertion apparatus, which trims and inserts the wires 56 into corresponding wire receiving portions 48 or 50 of a connector segment 10. As shown in FIG. 4A if only one of the wires 56 is sufficiently inserted along a passageway 86 in order to displace the rod 88, the flapper 92 will pivot in order to prevent displacement of the rod 88 and actuation of the wire insertion apparatus. It is only when both wires 56 are urged together against the flapper 92 will the rod 88 reciprocate. It has been found desirable to adjust the amount of force required by both wires 56 pressing against the flapper to cause displacement of the rod. This can be accomplished by selecting a spring 96 with either a stronger or weaker spring rate as desired. It has been found that too weak a spring rate will allow the wires 56 to be vibrated out of position, on occasion, when the wire trimming and insertion mechanism is actuated. Thus a sufficiently strong spring rate requires an operator to apply sufficient force of the wires 56 against the flapper 92 to displace the same and also to maintain the wires with a sufficient firmness against the anvil 58 throughout actuation of the wire insertion mechanism.

The flapper 92 ordinarily projects outwardly beyond the anvil 58, against which the wires 56 are to be positioned and maintained throughout actuation of the wire trimming and insertion mechanism. Accordingly, the wires 56 must displace the flapper 92 and rod 88 a sufficient distance to allow the wires 56 to impinge against the anvil 58 before the crank 102 activates the valve 108.

Figure 6:
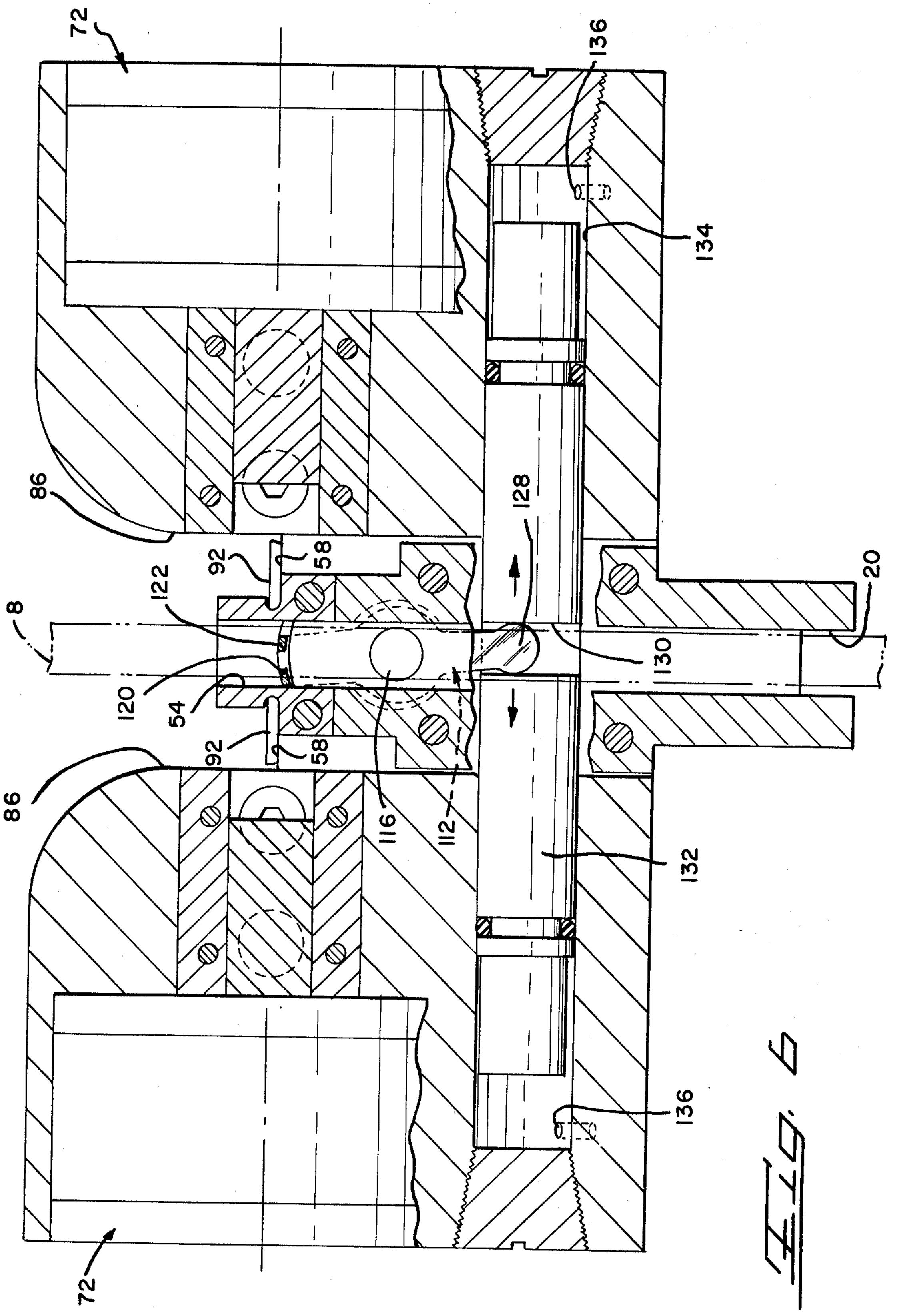
FIG. 6 is an enlarged fragmentary section taken along the line 6—6 of FIG. 2 illustrating a mechanism for positioning a wire-receiving portion of a connector segment in correct position for receipt of an inserted pair of wires.
Figures 7A, 7B:
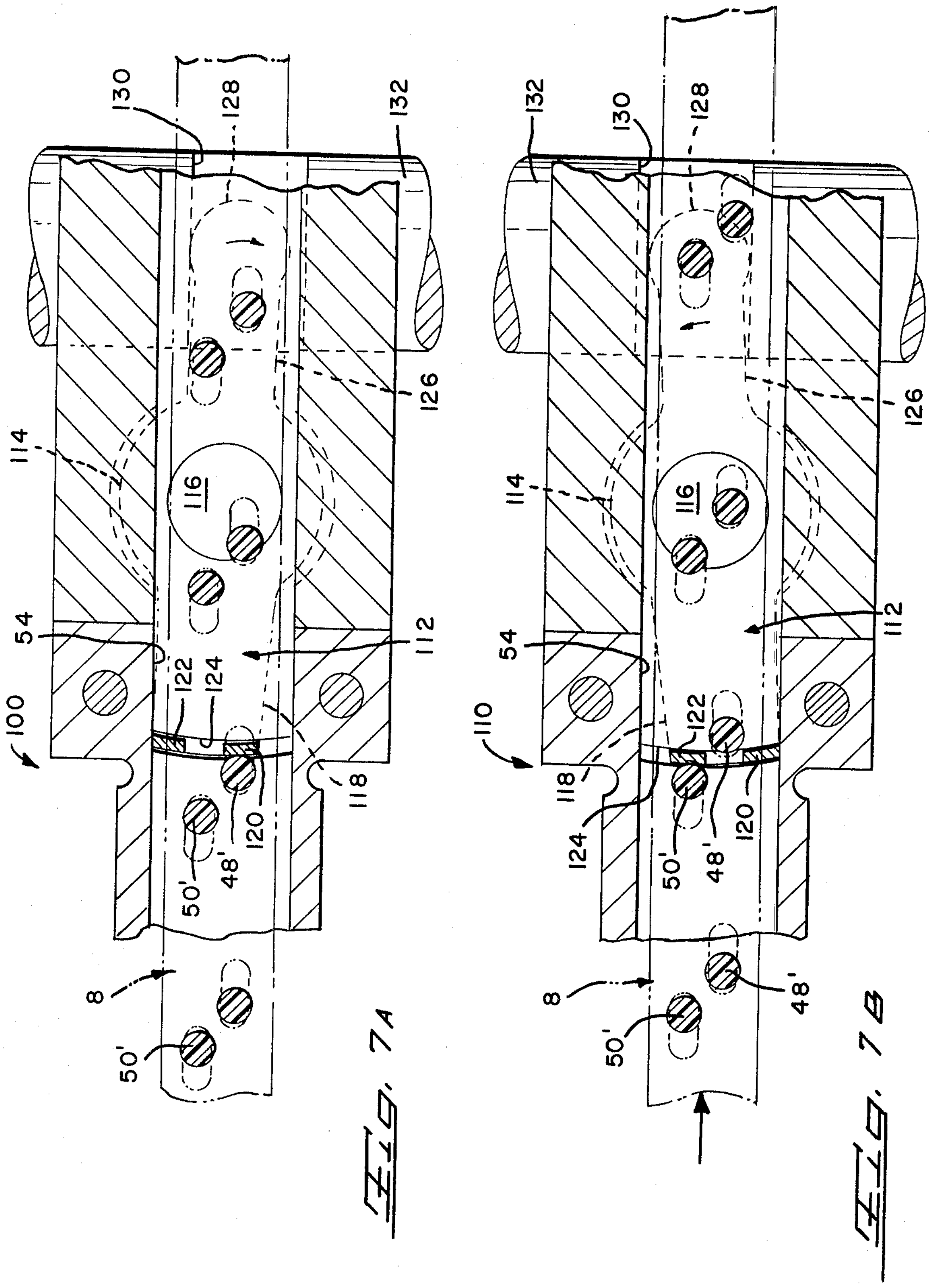
FIGS. 7A and 7B are enlarged fragmentary sections of a portion of the mechanism shown in FIG. 6 illustrating the details of a mechanism which respectively positions wire-receiving portions of connector segments in the apparatus for wire insertion.

The mechanism for positioning the connector segments 10 at the wire insertion station 18 is illustrated more particularly in FIGS. 6, 7A, and 7B. The mechanism, illustrated generally at 110, includes a lever 112 having an enlarged circular hub 114 rotatable about an enlarged fixed shaft 116. The hub 114 is disposed beneath the bottom wall of the channel 54. One arm 118 of the hub is provided with a pair of projecting barriers or gates 120 and 122 which are bent outwardly of the plane of the arm 118 to project through an arcuate slot 124 provided in the bottom wall of the channel 54. As shown in FIG. 7A, the arm 118 in a first position positions the gate 120 in the path of the stud 48' of a connector segment 10 such that when the carrier strip 8 is conveyed from left to right as shown in the Figure, the stud 48' will impinge against the gate 120 momentarily stopping the advance of the carrier strip 8 and correctly positioning the pair of wire receiving portions 48 of the connector segment 10 at the wire insertion station 18. Subsequent to connection of a pair of wires in the wire receiving portions 48 the arm 118 is pivoted about the shaft 116 to position the gate 122 in the path of the stud 50'. When the carrier strip 8 is advanced from left to right as shown in FIG. 7B the stud 48' will traverse past the gate 120 in the space between gates 120 and 122. The stud 50' will impinge against the gate 122 momentarily stopping the advance of the carrier strip and correctly positioning the pair of wire receiving portions 50 of a connector segment 10 in position to receive wire pairs trimmed and inserted by the wire insertion mechanism. Subsequent to wire connection in the wire receiving portions 50', the arm 118 is again shifted to its position shown in FIG. 7A disengaging the gate 122 from the stud 50' and allowing the stud 50' to be conveyed upon advancement of the carrier strip 8 and to pass in the space between the gates 120 and 122. Advancement of the carrier strip 8 continues until a stud 48' of a sequent connector segment impinges against the gate 120 positioning the wire receiving portions 48 of the sequent connector segment 10 at the insertion station 18.

From the foregoing, it is to be understood that the carrier strip 8 is advanced by the rack and pinion mechanism 36 and 40 until a corresponding stud 48' or 50' impinges against a corresponding gate 120 or 122. With a stud stopped against the corresponding gate, tension is supplied to the carrier strip 8 which halts rotation of the shaft 28 connected to one side of the one way clutch 34. Thus, any further rotation of the pinion 36 will cause the clutch 34 to slip and prevent further reeling of the tape on the take-up reel 26. The one way bearing 30 will lock up any tendency for the tension of the carrier strip 8 to cause unreeling thereof from the reel 26 or consequent backing up of the connector segment positioned on the wire insertion station 18. It is further understood from the foregoing description that the carrier strip is repeatedly advanced without a need for logic to determine the length of feed, and that the carrier strip feeding mechanism automatically adjusts the length of feed as determined by the variation in spacing between successive wire receiving portions which are either on the same connector segment 10 or on different connector segments tandemly carried on the strip.

The lever 112 additionally includes another arm 126 having a rounded end 128. As shown in FIG. 6, the rounded end 128 is disposed in a transverse slot 130 of a reciprocating double acting piston 132 slidably disposed within a piston chamber 134. By introducing air under pressure, through one of a pair of ports 136 while exhausting or venting air through the other of ports 136 the piston 132 will slidably reciprocate within the chamber 134 and pivot the lever 112 about the shaft 116.

In operation, a supply of air under pressure is connected to an entry port (not shown) which is opened and closed by the piston actuated valve 108. The carrier strip 8 with the connector segments 10 thereon is in the apparatus as shown in FIG. 1 with a connector segment 10 positioned at the wire insertion station such that the stud 48' thereof is engaged against the gate 120 which is in the position shown in FIG. 7A. The front end of the carrier strip 8 is partially reeled up on the take-up reel 26 which may be rotated by hand to apply some tension on the strip 8. The apparatus is ready for an operator to present a first pair of wires 56 on either side of the cusp 80 and into the wire receiving passageways 86.

Displaced by the urging of both of a first pair of wires 56 the crank 102 will activate the valve 108 and allow air pressure to be supplied by suitable air logic to the piston chambers 82 activating each of the wire trimming and insertion mechanisms inserting and trimming the wires 56 as shown in FIG. 3A, then returning each of the wire insertion mechanisms to a retracted position as shown in FIG. 3. Air pressure is then supplied by suitable air logic to one side only of the piston 132 to pivot the lever from its position shown in FIG. 7A to its position in FIG. 7B. Air also is applied in sequence first to the piston chamber 42' and then to the piston chamber 44' to reciprocate piston rod 40 in a forward stroke and then a return stroke which causes rotation of the pinion 36 in two directions, but rotation of the take-up reel 26 in only one direction, to advance the carrier strip 8 from its position shown in FIG. 7A to its position shown in FIG. 7B. The valve 108 is of a type which shuts off when the plunger 106 is released by the crank 102, which will happen when the spring 78 resiliently expands to return the rod 88 from its position shown in FIG. 4B to its position shown in FIG. 4A. As each pair of wires is presented by an operator to activate the valve 108, piston 132 is activated by a stroke in a single direction whereas the other pistons are activated in a forward and also a return stroke. The sequence of piston actuation is controlled by air logic devices of the type manufactured by Dynamco Inc., Dallas, Tex., as described in U.S. Pat. No. 3,618,636.

A test probe is illustrated in FIGS. 3 and 3A and comprises an elongated pin 138 mounted in an insulating sleeve 140. The pin extends the length of the piston rod 68 and protrudes from the sleeve 140 adjacent the insertion tooling head 64. The pin 138 is connected to a pair of input and output wires 140 which is utilized to connect either an indicator or a signal source. When the tooling is actuated to its position shown in FIG. 3A the probe 138 is reciprocated together with the ram 62. The pin 138 engages a portion of the contact 48" to test continuity thereof immediately upon wire insertion.

Although a specific embodiment of the present invention is described in detail other modifications and embodiments thereof which would be apparent to one having ordinary skill in the art is intended to be covered by the spirit and scope of the appended claims.

What is claimed is:

1. In apparatus for advancing and positioning wire-receiving portions of electrical connector segments in turn at a wire insertion station, together with first means for advancing in a first direction a carrier strip on which said connector segments are serially mounted, the improvement comprising:

each of said connector segments having a projection thereon corresponding to a respective one of said wire-receiving portions provided on each of said connector segments, said first means applying continuous tension on said carrier strip for advancing the same, and second means being moveable into and out of the path of each said projection and engaging each said projection, in turn, for positioning respective wire-receiving portions, in turn, at said wire insertion station, and for opposing said tension applied to said carrier strip and momentarily halting the advance of said carrier strip in said first direction, and third means connected to said first means for preventing movement of said carrier strip in a direction opposite to said first direction.

2. The improvement as recited in claim 1, wherein said first means comprises a reel rotatably mounted on a shaft, in turn, connected by a one way clutch to a drive means for rotating said shaft and said reel to wind said carrier strip upon said reel and advance said carrier strip in said first direction, and said third means comprises a one way bearing connected to said shaft.

3. The improvement as recited in claim 1, and further including:

a track surface, and further, wherein, each said connector segment is mounted on one side of said carrier strip, each said projection projects through said carrier strip from a second side thereof and engages said track surface, and said second means projects outwardly of said track surface and into the path of each said projection.

4. The structure as recited in claim 3, wherein said second means includes a pivotally reciprocating lever having a pair of gates thereon projecting outwardly of said track surface, said gates being pivoted by said lever, alternate with each other, into and out of the path of alternate, respective, said projections, so that each said projection, in turn, is engaged by a respective gate.

5. The improvement as recited in claim 4, wherein, said track surface includes a curved portion over which each said projection traverses and over which said carrier strip is flexibly bent to separate from each said projection.

* * * * *